F. G. WHEELER.
METHOD OF AND APPARATUS FOR PRODUCING PURIFIED SALT.
APPLICATION FILED NOV. 16, 1918.
1,342,519.  Patented June 8, 1920.
2 SHEETS—SHEET 2.
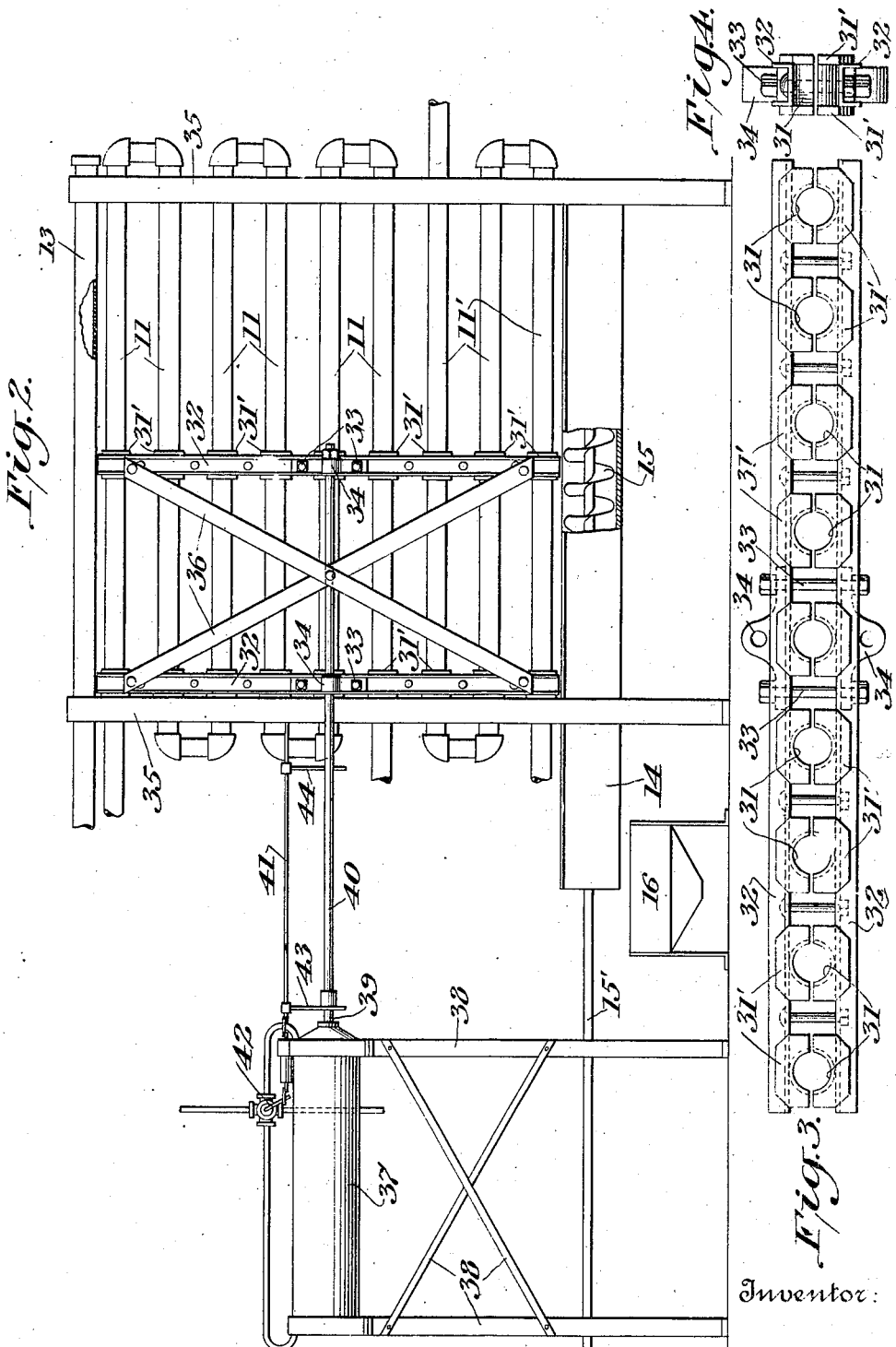
Inventor:
Frank G. Wheeler,
By Byrnes, Townsend & Brickenstein, Attorneys.

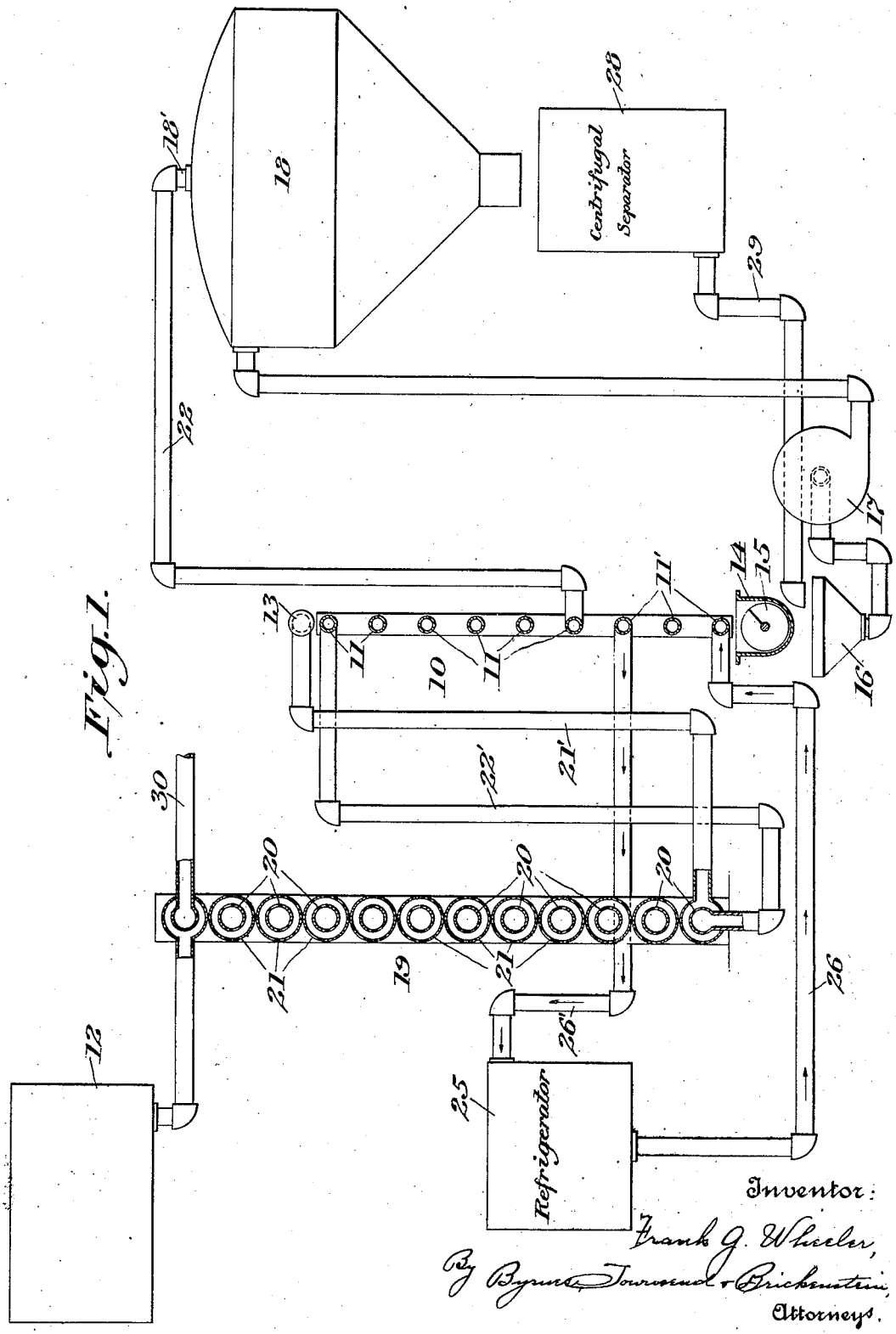

UNITED STATES PATENT OFFICE.

FRANK G. WHEELER, OF APPLETON, WISCONSIN, ASSIGNOR TO BLEACH PROCESS COMPANY, OF APPLETON, WISCONSIN, A CORPORATION OF WISCONSIN.

METHOD OF AND APPARATUS FOR PRODUCING PURIFIED SALT.

1,342,519.   Specification of Letters Patent.   Patented June 8, 1920.

Application filed November 16, 1918. Serial No. 262,819.

*To all whom it may concern:*

Be it known that I, FRANK G. WHEELER, a citizen of the United States, residing at Appleton, in the county of Outagamie and State of Wisconsin, have invented certain new and useful Improvements in Methods and Apparatus for Producing Purified Salt, of which the following is a specification.

This invention relates to the removal of sodium sulfate from brine.

It is well known that sodium chlorid is extensively used in the electrochemical industry as an electrolyte. Ordinary brine contains a small amount of calcium sulfate. The calcium can be easily precipitated as the carbonate forming sodium sulfate. When sodium chlorid containing sodium sulfate is electrolyzed, the sulfate takes part in the electrolysis, forming oxygen at the graphite anode which is consumed without any equivalent advantage or return. The sodium sulfate accumulates until it reaches saturation in the sodium chlorid solution and has to be removed in order to get the best results from the cells. It has therefore become important to remove the sodium sulfate as cheaply as possible from large quantities of brine.

It is the general object of the present invention to devise a method and apparatus for producing brine low in sodium sulfate cheaply and in commercial quantities.

Briefly stated the invention consists in subjecting brine containing sodium sulfate to the action of a cooling surface in such a way as to precipitate sodium sulfate crystals upon it and removing these crystals from the brine before they have a chance to redissolve.

The specific nature of the invention will be more fully described in the specification and the characteristics more particularly pointed out in the claims.

To facilitate the full understanding of the invention, reference is had to the appended drawings in which:—

Figure 1 is a diagrammatic view of an arrangement embodying the invention;

Fig. 2 is an elevational view of an apparatus with which the invention is principally identified; and Figs. 3 and 4 are views in end elevation and plan view, respectively of one of the scraper elements shown in Fig. 2.

Having reference to Fig. 1, 10 represents what is known as an open atmospheric cooler and is preferably of the construction shown, as consisting of a coil having a plurality of horizontal pipes 11 and 11' above each other in a vertical plane. From a storage tank 12 or other source, the brine is passed through a cooling apparatus to a distributing pipe 13 above the atmospheric cooler 10 whence it flows successively down over the cooling elements 11 and 11'. By the cooling apparatus, which will be described in detail, the brine is cooled to such an extent that when it comes in contact with the outer surface of the cool pipe portions 11 and 11', the sulfate crystallizes out and the crystals adhere to and accumulate on the portions 11 and 11'. By suitable slow moving scraping means the crystals so formed are loosened and detached from the pipes 11 and 11' and drop into a trough 14 below the cooler 10. This trough is equipped with a worm conveyer 15 which delivers both crystals and brine to a sump tank 16 from which the mixture is transferred by means of a pump 17 to a settling tank 18. The crystals settle in settling tank 18 and are drawn from the bottom of it together with some brine into a centrifugal drier 28 from which the sulfate is discharged in the form of a dry powder and the brine is returned to sump tank 16.

In order to carry out the process as economically as possible, the purified brine which is discharged from the settling tank through the opening 18' is utilized in turn to cool the incoming brine. For this purpose the purified brine is passed from the outlet 18' of the settling tank through the upper part of the atmospheric cooler coil comprising the pipes 11 and then through the inner coil 20 of the cooling apparatus which is a double coil exchanger. As indicated, the pipe or conduit 22 is connected to the atmospheric cooler so that the brine flows upwardly through the coils 11, leaves the top coil and passes through conduit 22' and then through the inner coil 20 of the double coil exchanger flowing from botton to top. In this manner the cold brine which has already been cooled in its flow through the apparatus, enters the cooling system at a relatively cold point, and flowing toward the warm end of it thereby absorbs heat from the incoming impure brine.

Since the cold purified brine obviously cannot reduce the warmer impure brine to the same temperature which it possessed, it is necessary, in order to maintain the temperature conditions of the system, to abstract the difference by means of a separate cooling unit. For this purpose a refrigeration apparatus 25 of suitable character and capacity is employed to cool a fluid which is circulated in an upward direction through the coldest part of the system comprising the lower pipe units 11' of the atmospheric cooler 10, from which it returns through conduit 26' to the refrigerator 25.

The complete operation is as follows:

The impure brine flows from the storage tank 12 down through the outer pipe 21 of the double coil exchanger 19 and is cooled by the purified brine flowing up through the inner coil 20. From the lower end of the outer coil 21 the brine is passed through a pipe 21' to distributing pipe 13 by which it is distributed over the cooler 10. As previously described the brine discharged from the distributing pipe 13 trickles down over the cold pipes 11 and 11' crystallizing out the impurity sulfate of sodium. These crystals are very adhesive and accumulate as they are formed on the surface of the pipes. They are loosened and detached by means of a scraper, and flow with the brine from one pipe to another almost like soap crystals from a ladle. The mixture is collected in trough 14 from which it is conveyed by means of a worm 15 to the sump tank 16. It is then transferred by means of a pump to the top of settling tank 18 entering it tangentially. The crystals settle in the tank 18, and are disposed of as described above. The purified brine is passed upwardly through the pipes 11 and the inner pipe 20 of the double coil exchanger and is discharged through pipe 30. It is seen that pipes 11 are cooled from within by means of the cold brine returning from the settling tank 18. Pipes 11' are cooled by means of a cold circulating fluid from the refrigeration apparatus 25 as described above.

The brine which is recovered from the centrifugal drier 28 and returned through the pipe 29 to sump tank 16, might advantageously be returned to the distributing pipe 13 to again pass over the atmospheric cooler 10, but we prefer to return it directly to the sump tank 16 as described. This is for the reason that when the crystals and brine are drawn from the settling tank 18 into the centrifugal drier 28, an air space would be left in the system if this return brine did not fill the space which would be made in this way. Should an air space be formed in the system, this would not cool the impure brine, neither in the cooler nor in the double pipe exchanger and would cause an uneven temperature condition during the process.

While it is theoretically immaterial what form of scraper mechanism may be applied for detaching the crystals from the surfaces of pipes 11 and 11', I have found by experience that special mechanism is necessary for carrying out the scraping operation and that the following gives good satisfaction: The scraper elements 31 are each composed of two sections forming when placed around the pipes a complete sleeve or bushing of short length and are provided at their ends with flanges 31'. The scraper elements on the various pipes are arranged vertically above each other and interconnected by channel rails or bars 32 of sufficient strength to combine them in a rigid structure. As shown, two oppositely placed channel rails 32 take up the space intermediate the flanges 31' and are bolted together, two of the bolts 33 serving also to attach at opposite sides ears 34. There are two sets of scrapers 31 spaced apart approximately half the length of the distance between the supports 35 on which the pipes 11 and 11' are mounted and these two sets are interconnected by bars 36. A hydraulic ram or motor 37 is supported on a frame 38 in alinement with the pipes and the piston rod 39 carries two connecting rods 40 which are connected to the ears 34 of both sets of scrapers. As a convenient mechanism for controlling the operation of the hydraulic motor is shown a rod 41 connected to the control valve 42 of the motor. This rod 41 carries two levers 43 and 44 spaced from each other the necessary distance to be engaged by the piston rod on its forward and backward stroke respectively to operate the valve to reverse the motor at the end of each stroke, as is well understood.

The worm 15 may be operated by a shaft 15' supported on the frame 38 to transfer the mixture of brine and crystals from trough 14 to sump tank 16.

While the above description has been made for the removal of sodium sulfate from solutions of sodium chlorid brine, the invention is in no wise limited to those two substances. It applies equally well to the removal of potassium sulfate from potassium chlorid solutions or for the removal of any salt from the solutions of another salt by means of cooling the solution of both salts to a point where the one precipitates and is removed from the solution in the manner described above.

While I prefer to carry out the invention substantially in the manner described and by the apparatus illustrated, there may be considerable latitude employed in the detail arrangement. What is disclosed is intended solely for the purpose of defining the principle on which the invention is based, by means of a concrete example.

Thus I have in the specification described the particular form of cooler which I have found to be highly efficient. The term "open atmospheric cooler," as used in the claims, is not, however, limited to the specific form shown, as other forms of coolers having extended outer cooling surfaces over which the brine can flow, are included thereunder.

I claim:—

1. The process of separating one salt from a solution containing different salts which consists in passing the solution over a cooling surface, thereby causing crystals of said salt to precipitate on said surface, detaching the crystals from such surface, collecting the solution and detached crystals, and removing the crystals from the solution before they have a chance to be redissolved therein.

2. The process of separating one salt from a solution containing different salts which consists in passing the solution over a plurality of cooling surfaces, thereby causing crystals of said salt to precipitate on said surfaces, detaching the crystals from such surfaces, collecting the solution and detached crystals, and removing the crystals from the solution before they have a chance to be redissolved therein.

3. The process of separating one salt from a solution containing different salts which consists in passing a solution over an open atmospheric cooler, precipitating the salt as crystals thereon, detaching the crystals from such surface, collecting the solution and detached crystals, and removing the crystals from the solution before they have a chance to be redissolved therein.

4. Apparatus for separating one salt from a solution containing different salts comprising means forming a cooling surface, means for passing the solution over said surface to precipitate the said salt thereon as crystals, means for detaching the crystals from said surface, means for collecting the detached crystals and solution and means for separating the crystals from the solution.

5. Apparatus for producing a purified salt from a solution containing as impurity another salt, comprising an open atmospheric cooler, means for passing the solution over said cooler, means for detaching the crystals from the surface of the cooler and means for removing the detached crystals from the solution.

6. Apparatus for producing a purified salt from a solution containing as impurity another salt, comprising an open atmospheric cooler, means for passing the solution over said cooler, means in advance of the said cooler for preliminarily cooling the solution to promote precipitation, means for detaching crystals from the surface of the open cooler and means for removing the detached crystals from the solution.

7. Apparatus for producing a purified salt from a solution containing as impurity another salt, comprising an open atmospheric cooler, means for passing the solution over said cooler, means in advance of the said cooler for preliminarily cooling the solution to promote precipitation, means for detaching crystals from the surface of the open cooler, means for removing the detached crystals from the solution and means for utilizing the purified solution as cooling medium in the open cooler.

8. Apparatus for producing a purified salt from a solution containing as impurity another salt, comprising an open atmospheric cooler, means for passing the solution over said cooler, means in advance of the said cooler for preliminarily cooling the solution to promote precipitation, means for detaching crystals from the surface of the open cooler, means for removing the detached crystals from the solution and means for utilizing the purified solution as cooling medium in the open cooler and in the preliminary cooler.

9. Apparatus for producing a purified salt from a solution containing as impurity another salt, comprising an open atmospheric cooler, means for passing the solution over said cooler, a double-coil exchanger having one coil connected to pass the solution to the open cooler, means for detaching the crystals from the surface of the open cooler, means for removing the detached crystals from the solution and means for passing the purified solution through the second coil of the double-coil exchanger to cool the solution passing to the open cooler and promote precipitation.

10. Apparatus for producing a purified salt from a solution containing as impurity another salt, comprising an open atmospheric cooler having a plurality of cooling units, means for passing the solution over said cooler, means in advance of the said cooler for preliminarily cooling the solution to promote precipitation, means for detaching crystals from the surface of the open cooler, means for removing the detached crystals from the solution and means for utilizing the purified solution as cooling medium in some of the cooling units of the open cooler and in the preliminary cooler.

11. Apparatus for producing a purified salt from a solution containing as impurity another salt, comprising an open atmospheric cooler having a plurality of cooling units, means for passing the solution over said cooler, means for detaching the crystals from the surface of the open cooler, means for removing the detached crystals from the solution, means for utilizing the purified solution as cooling medium in some of the cooling units of the open cooler and means for separately cooling the other cooling units thereof.

12. Apparatus for producing a purified salt from a solution containing as impurity another salt, comprising an open atmospheric cooler having a plurality of cooling units, means for passing the solution over said cooler, means for detaching the crystals from the surface of the open cooler, means for removing the detached crystals from the solution, means for utilizing the purified solution as cooling medium in some of the cooling units of the open cooler and in the preliminary cooler and means for separately cooling the other cooling units of the open cooler.

13. Apparatus for producing a purified salt from a solution containing as impurity another salt, comprising an open atmospheric cooler having a plurality of cooling units, means for passing the solution over said cooler, means for detaching the crystals from the surface of the cooler, a settling tank and a means for separating the crystals from the solution and means for utilizing the purified solution as cooling medium in the cooler.

14. Apparatus for producing a purified salt from a solution containing as impurity another salt, comprising an open atmospheric cooler having a plurality of cooling units, means for passing the solution over said cooler, means for detaching the crystals from the surface of the cooler, a settling tank to receive the crystals and the solution, means connected to the settling tank for passing the purified solution through the cooler, a means connected to the settling tank to receive the crystals and separate therefrom the adhering solution, and means for returning the solution thus separated to the settling tank.

15. Apparatus for producing a purified salt from a solution containing as impurity another salt, comprising an open atmospheric cooler consisting of two coils, a double coil exchanger, means for passing the solution through one coil of the exchanger to the open cooler and means for distributing the solution over the surface of the cooler, means for scraping the surface of the cooler to detach crystals precipitated thereon, means for removing the detached crystals from the solution, means for passing the purified solution through one coil of the open cooler and through one coil of the double coil exchanger, a refrigeration machine and means for forming a cooling circuit through the refrigeration machine and the second coil of the open cooler.

16. Apparatus for producing a purified salt from a solution containing as impurity another salt, comprising an open atmospheric cooler having a relatively large cooling surface, means for substantially uniformly distributing the solution over the said surface, means for detaching the crystals formed on the surface, and means for removing the detached crystals before they have a chance to be redissolved.

17. Apparatus for producing a purified salt from a solution containing as impurity another salt, comprising an open atmospheric cooler having a relatively large cooling surface, means for preliminarily cooling the solution, means for substantially uniformly distributing the cooled solution over the said surface, means for detaching the other salt as crystals formed on the surface and means for removing the crystals before they have a chance to be redissolved.

In testimony whereof I affix my signature.

FRANK G. WHEELER.